United States Patent [19]
Sheldon et al.

[11] 4,384,403
[45] May 24, 1983

[54] BUILDING ERECTION TOOL

[76] Inventors: Robert W. Sheldon, 560 Carriage Dr., NE., Atlanta, Ga. 30328; Richard W. Mullin, Fox Ridge Rd.; Jesse F. Bowden, Meadow Dr., both of Eufaula, Ala. 36027

[21] Appl. No.: 179,098

[22] Filed: Aug. 18, 1980

[51] Int. Cl.[3] .............................................. B23P 19/00

[52] U.S. Cl. ........................................ 29/798; 29/240; 29/281.1; 29/432; 29/526 R; 227/15; 227/30; 227/124; 81/418; 81/420

[58] Field of Search .............. 29/432, 798, 240, 281.1, 29/526 R; 81/5.1 R, 418, 420; 411/387; 269/1.2, 81.1, 81.3, 38, 43; 227/15, 30, 119, 124, 149

[56] References Cited

U.S. PATENT DOCUMENTS

| | | | |
|---|---|---|---|
| 1,838,973 | 12/1931 | Wilder | 227/15 |
| 1,901,386 | 3/1933 | White | 227/149 X |
| 1,945,892 | 2/1934 | dit Daude | 227/15 |
| 1,969,214 | 8/1934 | dit Daude | 227/18 |
| 2,570,048 | 10/1951 | Coake et al. | 227/15 |
| 2,837,948 | 6/1958 | Erdmann | 81/5.1 |
| 2,874,383 | 2/1959 | Wieneke | 227/149 X |
| 3,517,874 | 6/1970 | Cressy | 227/15 X |
| 3,882,756 | 5/1975 | Sauer et al. | 411/387 |
| 3,960,307 | 6/1976 | Doyel | 227/149 X |
| 4,003,417 | 1/1977 | Cornwell | 227/149 X |

FOREIGN PATENT DOCUMENTS

| | | | |
|---|---|---|---|
| 1136523 | 5/1957 | France | 227/149 |
| 11935 | of 1913 | United Kingdom | 227/149 |

*Primary Examiner*—Charlie T. Moon
*Attorney, Agent, or Firm*—B. J. Powell

[57] ABSTRACT

A positioning tool for use in attaching the cover panels to support members in a prefabricated building system using self-drilling and self-tapping fasteners and a locking member which includes locating means for positioning the locking member behind the overlapped cover panels and guide means for locating the fastener against the support member opposite the locking member so that the fastener is aligned with the locking member and, as the fastener is installed by self-drilling and self-tapping its way through the juxtaposed support member and cover panels, the locking member will be threadedly engaged by the fastener to hold the cover panels against the support member between the head of the fastener and the locking member.

6 Claims, 17 Drawing Figures

FIG 1
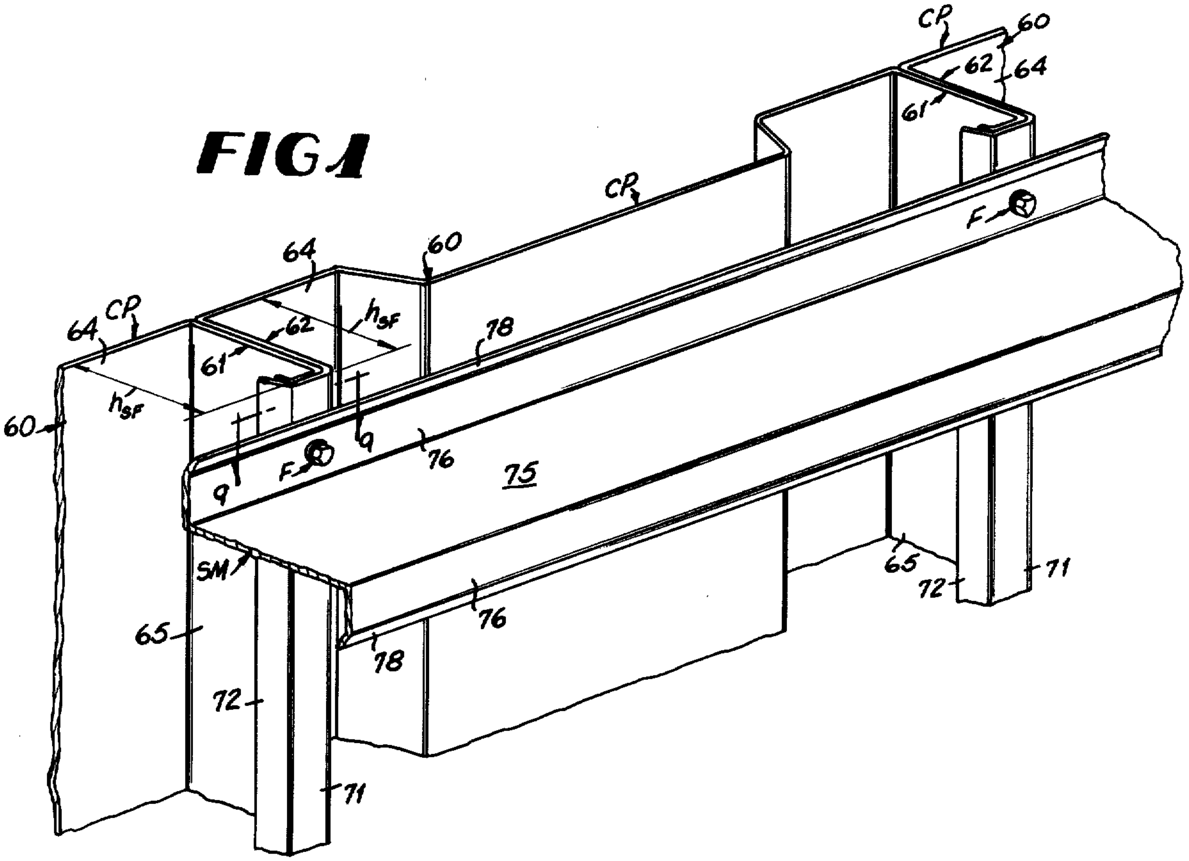
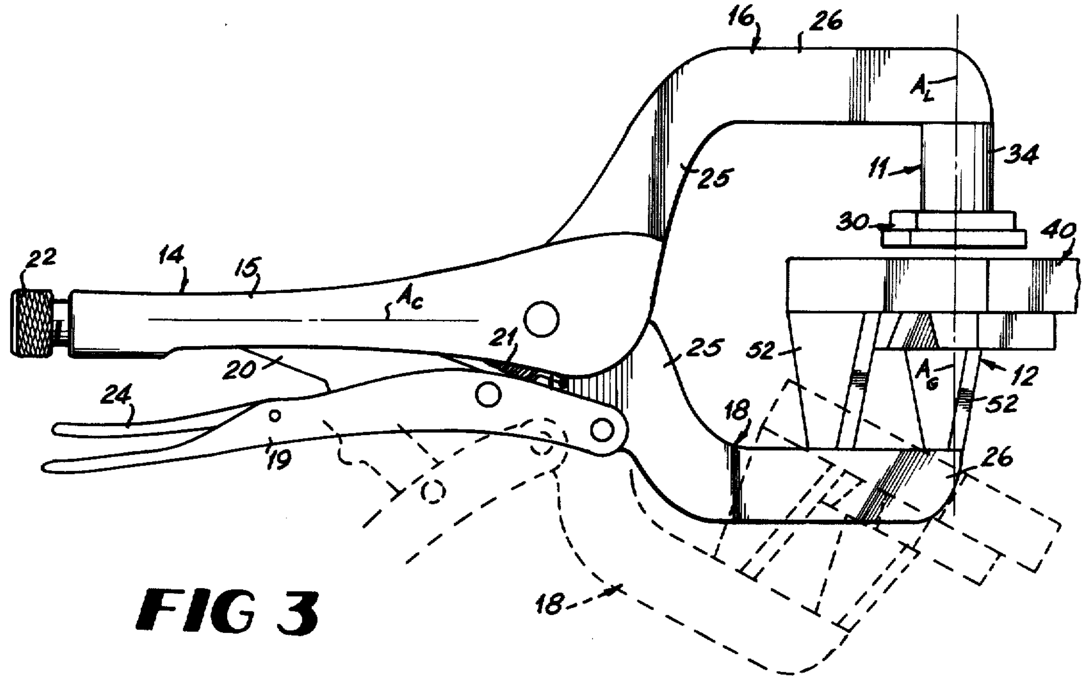
FIG 3

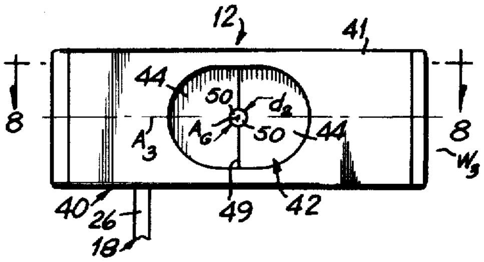
FIG 7
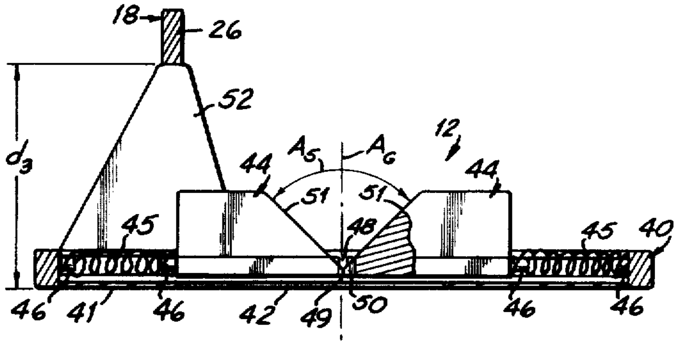
FIG 8
FIG 9
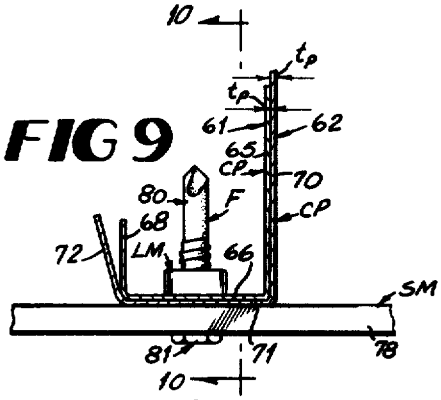
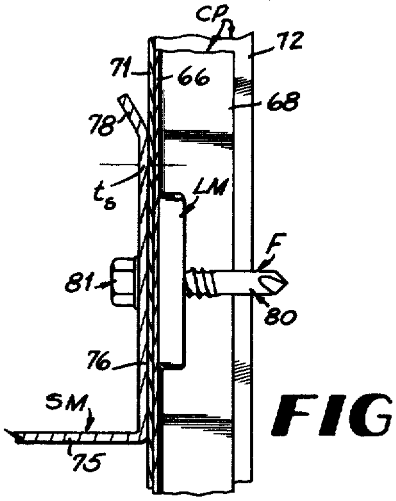
FIG 10
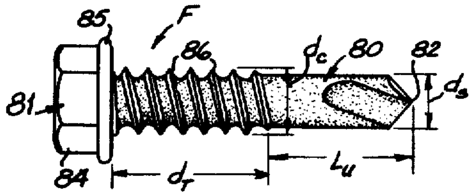
FIG 11
FIG 12
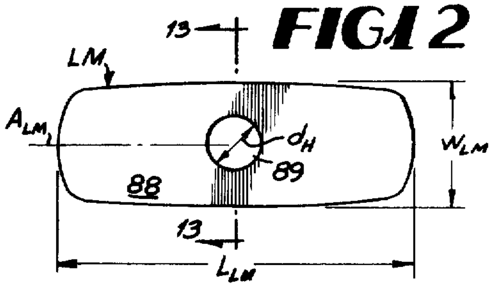
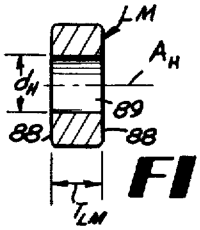
FIG 13

BUILDING ERECTION TOOL

BACKGROUND OF THE INVENTION

Prefabricated buildings have gained widespread acceptance as a result of their reduced fabrication costs. These prefabricated buildings commonly have a building framework with spaced apart upstanding side beams and roof beams between which are connected a plurality of generally horizontally extending support members. These horizontally extending support members are commonly known as girts when they are located in the side walls of the building and purlins when they are located in the roof of the building. Fasteners are then used to attach exterior cover panels to the girts and purlins to provide an exterior covering for the building. In order to compete with custom fabricated buildings, the cost of component fabrication and the cost of erection of prefabricated buildings must be minimized. At the same time, corrosion, especially at the fastener joints, must be minimized in order for the useful life of the prefabricated building to be acceptable.

Two different systems have evolved for fabricating and erecting prefabricated buildings. Both systems fabricate and erect the side beams and roof beams in about the same way with their differences lying primarily in the fabrication and erection of the support members and the cover panels. One system (the inside system) requires the workmen erecting the building to install the cover panels from the inside of the building while the other system (the outside system) requires the workmen erecting the building to install the cover panels from the outside of the building. Each of these systems has certain advantages and disadvantages.

The inside system uses cover panels with inwardly projecting spacer legs along opposite sides of the cover panel that project inboard of the exterior section of the cover panel. Mounting flanges are provided on the inboard ends of the spacer legs and are arranged so that the mounting flanges on adjacent cover panels can be overlapped. These overlapped mounting flanges are used to attach the cover panels to the outside of the support members with the fasteners. It will thus be seen that the fasteners are located inside the building and thus not exposed to the outside environment. This is the primary advantage of the inside system since corrosion is significantly decreased by the fasteners not being exposed to the outside environment. In this system, the support members used to support the cover panels are prepunched with holes spaced along the length of the support members during the fabrication operation and prior to building erection. Likewise, the mounting flanges on the cover panels are also prepunched with holes during the fabrication operation and prior to building erection. These prepunched holes are located so that the holes in the mounting flanges on the cover panels align with each other when the mounting flanges of adjacent cover panels are overlapped during building erection and also so that the prepunched holes in the mounting flanges align with the prepunched holes in the support members when the cover panels are positioned against the support members during building erection.

During building erection, the workmen position the cover panels so that the mounting flanges on adjacent cover panels are overlapped with the prepunched holes aligned and so that the overlapped mounting flanges on the cover panels lie against the support member with the prepunched holes through the cover panel mounting flanges and the support member aligned. While holding the cover panels in this position, the workmen insert conventional threaded fasteners from the inside of the support member through the aligned prepunched holes in the support member and the cover panel mounting flanges. The workmen start an internally threaded nut on that end of the fastener projecting through the holes behind the cover panel mounting flanges and then tighten the fastener and nut to attach the cover panels to the support members. The limited space available between the exterior section of the cover panels and overlapped mounting flanges requires the workmen to install the fastener from the inside of the support member so that the fastener extends first through the support member and then through the cover panel mounting flanges. The cover panel mounting flanges are too thin to engage the threads on the fastener sufficiently to maintain the strength of the connection between the cover panels and support members thus requiring the use of the nut on the fastener behind the cover panel mounting flanges to keep the cover panels in place. The limited space between the exterior section on the cover panels and the overlapped mounting has also required that the nut be tightened by turning the fastener while holding the nut against rotation. Because of this, the use of self-drilling and self-tapping fasteners which could eliminate the prepunching of holes has effectively been prevented in connection with this system. As a result, the prepunching operations used with this system have kept the fabrication costs of the cover panels and support members relatively high. This system has also required that the building framework be located with more accuracy than normally required so that the holes in the support member were properly aligned with the holes in the cover panels.

In the outside system, cover panels are used whose exterior sections could be overlapped and placed against the support members on the building framework. The workmen install fasteners holding the cover panels onto the support members from the outside of the building through the overlapped edges of the cover panels and into the support members. This allows the fastener to be screwed into the support member so that the head of the fastener clamps the overlapped edges of the cover panels against the support members. Because the support members are sufficiently thick to engage the threads on the fastener and maintain the strength of the joint, the need for a nut can be eliminated, thus permitting the use of self-drilling and tapping fasteners. On the other hand, it is difficult to determine the location of the support members from the outside of the building once the cover panels have been positioned for installation. As a result, the workmen typically predrill holes through the cover panels at those locations where the cover panels will lie against the support members. The cover panels are then overlapped so that these predrilled holes are aligned with each other and with the support members. The workmen, using the predrilled holes through the cover panels as a guide, then install self-drilling and self-tapping fasteners through these holes and into the support members so that the fastener threadedly engages the support member to keep it in place while the fastener head clamps the overlapped cover panels onto the support member. While this system helps minimize the fabrication costs of the cover panels and support members, the erection costs are maintained relatively high due to the predrilling of the holes through the cover panels prior to being positioned on the building framework. This system also leaves the heads of the fasteners exposed to the outside environment and thus requires special fasteners or special techniques to reduce the corrosion of the exposed head of the fastener.

SUMMARY OF THE INVENTION

These and other problems and disadvantages associated with the prior art are overcome by the invention disclosed herein by providing a prefabricated building system in which predrilled or prepunched holes are not required through the support members and/or the cover panels, which permits the fasteners to be installed from the inside of the building so that they are not exposed to the outside corrosive environment, and which permits the workmen to use self-drilling and self-tapping fasteners to drill the holes through the cover panels and support member as an incident to the installation of the fastener while at the same time installing a locking member on the fastener to keep the cover panels in place. The invention provides a positioning tool which properly locates the locking member to be installed on the fastener in the limited working space behind the cover panels and also provides a guide for a self-drilling and self-tapping fastener to maintain alignment between the locking member and self-drilling and self-tapping fastener as it is installed. The positioning tool also clamps the cover panels onto the support member while the fastener is being installed. As a result, the workmen use the positioning tool to position the locking member behind the cover panels in opposition to the support member. Then using the positioning tool as a guide to start the self-drilling and self-tapping fastener, they install the fastener from the inside of the support member. This inherently screws the locking member onto the fastener to keep the cover panels in place, yet allows the self-drilling and self-tapping fastener to be used so that the need to prepunch or predrill holes through the cover panels and/or support members is eliminated. This serves to minimize both the fabrication and erection costs associated with the building. The invention also permits the use of a simplified locking member so that the cost of fabrication of the locking can be minimized.

The invention uses cover panels with spacing legs along opposite edges of the cover panels equipped with side flanges spaced inboard of the exterior section on the cover panels similar to that used with the prior art inside system for building erection. A positioning tool is provided which clamps the overlapped side flanges of the cover panels to the support members to which they are to be attached. The positioning tool includes a locating assembly which mounts the locking member therein and locates the locking member on the backside of the overlapping side flanges of the cover panels opposite the support member. The positioning tool also includes a guide assembly located on the inside of the support member which serves to guide the self drilling and tapping screw as the hole through the support member is started so that the self-drilling and tapping screw will be properly aligned with the locking member as the screw proceeds through the support member and the overlapped attachment flanges on the cover panels. The guide assembly is retractable so that the head of the screw can pass thereby and bear against the support member when the fastener is fully installed. The locating assembly and guide assembly are carried by a clamping assembly which locates the locating assembly and guide assembly with respect to each other and forces the locating assembly and guide assembly together to clamp the overlapping attachment flanges on the cover panels and the support member together.

These and other features and advantages of the invention will become more apparent upon consideration of the accompanying drawings and the following detailed description wherein like characters of reference designate corresponding parts throughout the several views and in which:

BRIEF DESCRIPTION OF THE DRAWINGS

FIG. 1 is a perspective view showing a portion of a building erected using the invention;

FIG. 3 is an enlarged side elevational view of the tool of the invention taken generally along line 3—3 in FIG. 2;

FIG. 7 is an enlarged face view of the guide assembly of the invention;

FIG. 8 is an enlarged cross-sectional view taken generally along line 8—8 in FIG. 7;

FIG. 9 is an enlarged cross-sectional view taken generally along line 9—9 in FIG. 1;

FIG. 10 is a cross-sectional view taken generally along line 10—10 in FIG. 9;

FIG. 11 is an enlarged side view of the fastener used with the invention;

FIG. 12 is an enlarged front elevational view with the locking member used with the invention;

FIG. 13 is a cross-sectional view taken generally along line 13—13 in FIG. 12.

DETAILED DESCRIPTION OF ILLUSTRATIVE EMBODIMENTS

As seen in the figures, the building system embodying the invention includes a plurality of cover panels CP which are attached to and supported by spaced apart support members SM. The support members SM are part of the building framework and are supported on the upstanding side beams and roof beams (not shown). The cover panels CP form the exterior covering of the building. The support members SM are usually mounted so that they extend generally horizontally while the cover panels CP are oriented generally perpendicular to the support members SM. In accordance with the invention, the cover panels CP are attached to the support members SM with self-drilling and self-tapping fasteners F and locking members LM as will become more apparent. A positioning tool 10 is provided to position the locking member LM and guide the fastener F during the installation of the fastener F through the support member SM and cover panels CP and the installation of the locking member LM on the fastener F.

Figure 2:
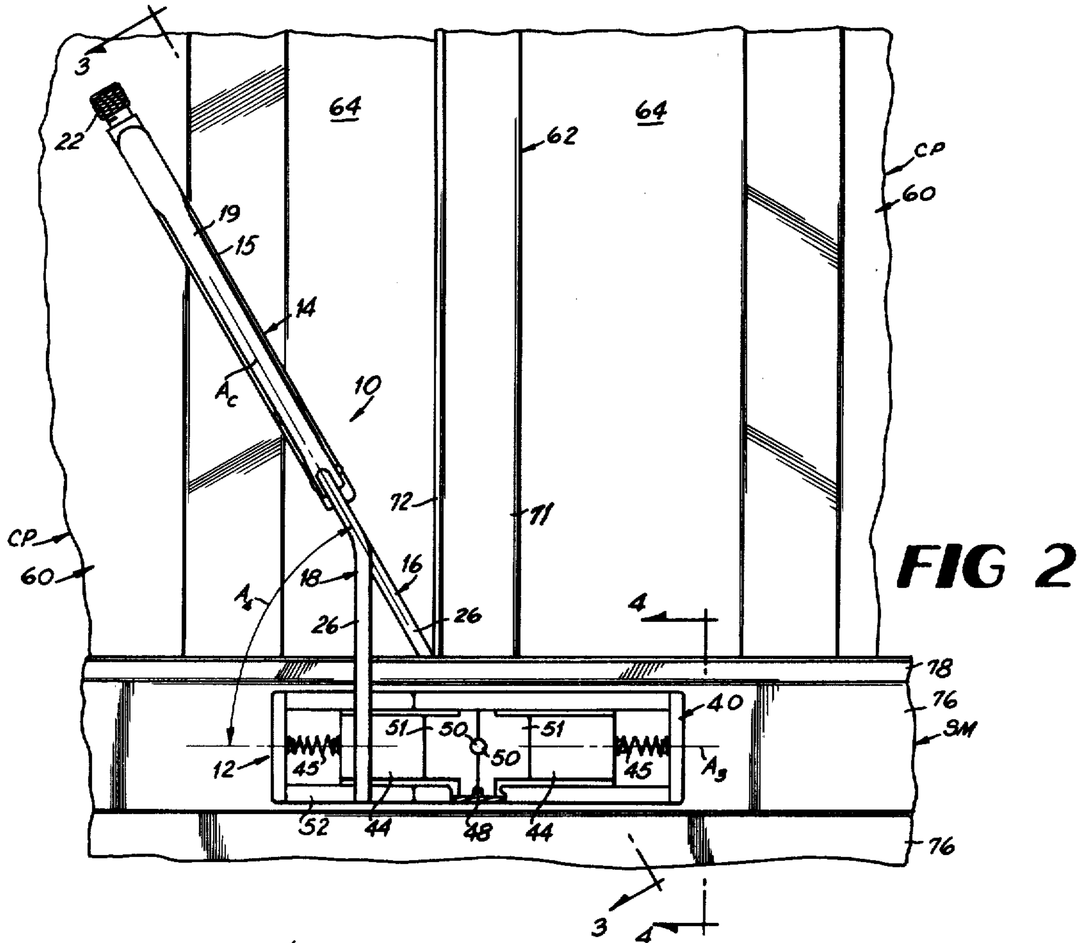
FIG. 2 is an enlarged view showing the tool of the invention being used to erect a building.
Figure 4:
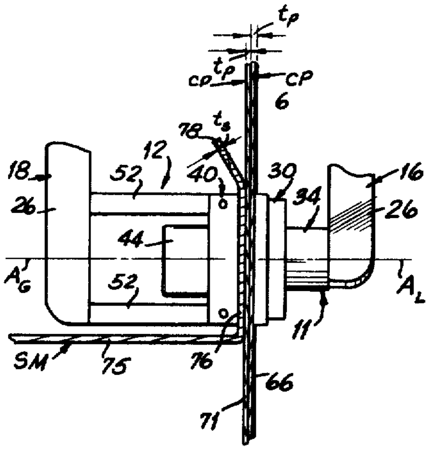
FIG. 4 is a view taken generally along line 4—4 in FIG. 2.

The positioning tool 10 seen in FIGS. 2–4 includes a locating assembly 11 for locating the locking member LM during installation, a guide assembly 12 for guiding the fastener F during installation and a clamping assembly 14 carrying the locating assembly 11 and guide assembly 12. The clamping assembly 14 serves to position the locating assembly 11 and guide assembly 12 with respect to each other and to cause the locating assembly 11 and guide assembly 12 to clamp the cover panels CP and support member SM therebetween as will become more apparent.

The clamping assembly 14 best seen in FIG. 3 incorporates the well known locking mechanism sold under the trade name "Vise-Grip". The clamping assembly 14 includes a base handle 15 which mounts a pair of clamping arms at one end thereof. One of the clamping arms designated 16 is fixedly mounted on the base handle 15 while the other clamping arm designated 18 is pivoted to the base handle 15 so that the clamping arms 16 and 18 can be moved toward and away from each other. A secondary handle 19 is pinned to the movable clamping arm 18 and extends along the base handle 15 with a positioning link 20 pinned to the secondary handle 19 at one of its ends and riding in an appropriate slot in the base handle 15 at the opposite end so that, as the secondary handle is moved toward the base handle, the positioning link 20 causes the handles 15 and 19 to reach a locked position so that the clamping arms 16 and 18 cannot be moved away from each other. An opening spring 21 connects the movable clamping arm 18 with the base handle 15 so that, once the secondary handle and base handle are unlocked, the spring 21 moves the clamping arms 16 and 18 away from each other. A positioning screw 22 carried in the base handle 15 engages that end of the positioning link 20 carried in the slot in the base handle 15 to adjustably change the locked position of the handles 15 and 19, and thus the relative spacing of the clamping arms 16 and 18. Typically, a release lever 24 is provided on the secondary handle 19 to assist in moving the handles 15 and 19 away from their locked position. This locking function is well known and will not be described in further detail.

As best seen in FIG. 3, both clamping arms 16 and 18 have a spacer portion 25 connected to the base handle 15. These spacer portions 25 extend laterally away from the base handle 15 in opposite directions and lie in a common plane. Both clamping arms 16 and 18 also have a projecting portion 26 integral with the projecting ends of the spacer portions 25 so that the projecting portions 26 are spaced apart and project forwardly of the handle 15. The locating assembly 11 is mounted on the projecting end of the projecting portion 26 of the fixed clamping arm 16 and the guide assembly 12 is mounted on the projecting end of the projecting portion 26 of the movable clamping arm 18. The locating assembly 11 and guide assembly 12 extend from the clamping arms 16 and 18 so that, as the arms 16 and 18 are moved toward each other, the cover panels CP and support member SM can be clamped between the assemblies 11 and 12 as will become more apparent. As seen in FIG. 4, the locating assembly 11 has a central axis $A_L$ and the guide assembly 12 has a central axis $A_G$ with the guide assembly 12 and locating assembly 11 being mounted on the clamping arms 16 and 18 so that, when the clamping assembly 14 is in a locked position, the axes $A_L$ and $A_G$ are generally coaxial with each other. The axes $A_L$ and $A_G$ are also illustrated as generally normal to the axis $A_C$ of the clamping assembly 14 seen in FIGS. 2 and 3.

Figure 5:
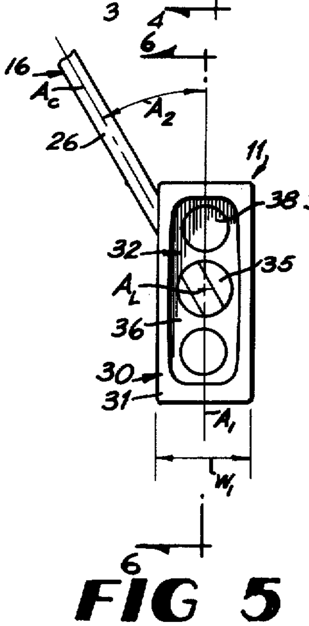
FIG. 5 is a face view of the locating assembly of the invention.
Figure 6:
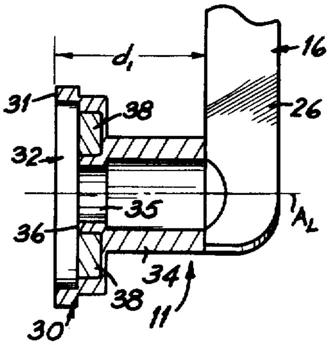
FIG. 6 is a cross-sectional view taken generally along line 6—6 in FIG. 5.

The locating assembly 11 seen in FIGS. 4–6 includes a base 30 defining a working face 31 thereon facing the guide assembly 12 and oriented normal to the axis $A_L$ of the locating assembly 11. The base section 30 defines a locating recess 32 therein which opens onto the working face 30 and which is sized to receive the locking member LM and to locate the locking member LM so that one side of the locking member LM is coplanar with the working face 31 as will also become more apparent. The locating assembly 11 also includes a spacer 34 which connects the base section 30 to the projecting end of the clamping arm 16 so that the working face 31 is spaced inboard of the projecting section 36 of arm 16 a distance $d_1$ so that the clamping arm 16 will clear the cover panels CP as will become more apparent. The spacer section 34 and base section 30 define a common central opening 35 therethrough concentrically of axis $A_L$ to provide clearance for the fastener F to pass therein as will become more apparent. It will be seen that the central opening 35 opens onto the recessed surface 36 of the locating recess 32. Magnets 38 are also mounted in the base 30 at the recessed surface 36 outboard of the central opening 35 to magnetically hold the locking member LM within the locating recess 32 as will become more apparent. The working face 31 of the base 30 is illustrated generally rectilinear in shape with a longitudinal axis $A_1$ and a width $W_1$ transversely of the longitudinal axis $A_1$. The longitudinal axis $A_1$ of the working face 31 is oriented at an included angle $A_2$ with respect to the central axis $A_C$ of the clamping assembly 14 as seen in FIG. 2 so that the clamping assembly 14 clears the cover panels CP as will become more apparent.

The guide assembly 12 seen in FIGS. 4, 7 and 8 includes a mount 40 which defines a working face 41 thereon generally normal to the central axis $A_G$ of the guide assembly 12. The working face 41 faces the working face 31 on the locating assembly 11. The working faces 31 and 41 are arranged so that they are generally parallel to each other when the clamping assembly 14 is in its locked position. The working face 41 is also generally rectilinear in shape with a longitudinal axis $A_3$ and a width $W_2$ transversely of axis $A_3$ such that it will engage the support member SM as will become more apparent. As best seen in FIG. 2, the longitudinal axis $A_3$ is perpendicular to the longitudinal axis $A_1$ of the locating assembly 11 and defines an included angle $A_4$ with the axis $A_C$ of the clamping assembly 14 so as to allow the clamping assembly 14 to clear the support member SM as will become more apparent. The mount 40 defines an opening 42 therein which extends through the working face 41. A pair of retractable guide members 44 are movably mounted on the mount 40 in the opening 42 for movement toward and away from each other generally along the longitudinal axis $A_3$ of the working face 41. A pair of springs 45 serves to urge the guide members 44 toward each other and are positioned between the outboard ends of the guide members 44 and the mount 40. The springs 45 are held in position by locating pins 46 on the guide members 44 and mount 40. Stops 48 are provided on the base section 40 to locate the guide members 44 so that their inboard ends 49 are centered on the central axis $A_G$ of the guide assembly 12 when they are forced toward each other.

The inboard ends 49 on the guide members 44 are provided with complementary semi-circular cutouts 50 which form a circular opening of diameter $d_2$ when the ends 49 engage stops 48. It will also be seen that the semi-circular cutouts 50 are arranged so that they are concentric about the central axis $A_G$ when the ends 49 engage stops 48. Each of the guide members 44 is provided with a camming surface 51 which extends from the inboard ends 49 of the member 44 outwardly of the working face 41 on the mount 40 and away from the central axis $A_G$ so that the camming surfaces 51 extend away from each other to define an included angle $A_4$ therebetween when the ends 49 engage stops 48. Thus, it will be seen that when a member larger in diameter than the semicircular cutouts 50 is forced along the central axis $A_G$ past the guide members 44 toward the working face 41, the camming surfaces 51 will be engaged by such member to retract the guide members 44 away from each other to allow the member to pass therebetween as will become more apparent.

The guide assembly 12 also include spacers 52 which connects the mount 40 with the projecting end of the movable clamping arm 18 so that the working face 41 on the base section 40 is spaced the distance $d_3$ from the clamping arm 18 and the clamping arm 18 will clear the support member SM as will become more apparent. It will also be noted that the projecting portion 26 of the movable clamping arm 18 is displaced at an angle $A_5$ from the plane of the spacer portions 25 of the arms 16 and 18 as seen in FIG. 2 to provide clearance for installing the fastener F as will become more apparent.

Referring to FIG. 1, it will be seen that the cover panels CP are oriented generally perpendicular to the support member SM. While only one support member SM is shown, it will be understood that at least two support members SM are used to support the cover panels CP therebetween. The cover panels CP are attached to the support members SM in a side-by-side relationship to form the exterior covering of the building.

Each of the cover panels CP has a central section 60 with complementary flange sections 61 and 62 integral with opposite sides of the central section 60. The flange sections 61 and 62 are placed against the support member SM and used to attach the cover panels CP to the support member. This spaces the central section 60 outwardly of the support members SM. The flange sections 61 and 62 are designed so that, when the cover panels CP are placed in a side-by-side position, the flange section 61 on each of the cover panels will nest with the flange section 62 on the adjacent cover panel. These nesting flange sections are attached to the support member SM as a unit and thus seal the cover panels CP to each other. The nesting flange sections 61 and 62 are located so that they are accessible from the inside of the building to be attached to the support members SM.

Typically, the cover panels CP and support members SM are each formed from sheet material with a constant cross-sectional thickness. Thus, cover panel CP has a cross-sectional thickness $t_p$ (FIG. 10) while the support member SM has a cross-sectional thickness $t_s$ (FIG. 11). When sheet metal is used, 20–26 gage material is typically used for the cover panels CP, and 12–18 gage material is used for support members SM. Thus, the panel thickness $t_p$ is typically 0.036–0.018 inch while the support member thickness $t_s$ is typically 0.0105–0.048 inch.

The central section 60 of each cover panel CP has a constant width along its length and a convenient length so that the panels CP may be easily handled during the erection of the building. The central section 60 defines the exterior appearance of the building and thus may have a variety of cross-sectional shapes, depending on the desired exterior appearance of the building. The central section 60 has an outside surface which faces exteriorly of the building and an inside surface 64 which faces the interior of the building.

Referring to FIGS. 1 and 10, flange section 61 includes a side flange 65 integral with one side edge of the central section 60 of the cover panel CP. The side flange 65 extends along the length of the central section 60 and projects interiorly of the central section 60 so as to define an included angle, usually a right angle as shown, with the inside surface 64 on the central section 60. The side flange 65 has a projecting height $h_{SF}$, shown at about three inches, along its length so that the projecting edge on the side flange 65 is generally parallel to the plane of the central section 60.

An attachment flange 66 is integral with the projecting edge of the side flange 65 and projects outwardly therefrom so that the attachment flange 66 is spaced from and extends outwardly of the central section 65 of the panel CP. The attachment flange 66 defines a prescribed included angle with the side flange 65, illustrated at 90°, and has a prescribed transverse width along its length. It is the attachment flange 66 that is used to attach the cover panel CP to the support members SM.

A locating lip 68 is integral with the projecting edge of the attachment flange 66 and projects outwardly therefrom toward the exterior of the building. The locating lip 68 defines a prescribed obtuse angle shown at about 100° with the attachment flange 66 and extends along the length of the attachment flange 66. The angle between the flange 66 and lip 68 is selected to cause the flange section 62 on the adjacent cover panel to nest within the recess defined by the side flange 65, attachment flange 66 and locating lip 68. The locating lip 68 has a convenient height along its length and is illustrated at about $\frac{3}{4}$ inch.

As also seen in FIGS. 1 and 10, flange section 62 includes a side flange 70 integral with the opposite side edge of the central section 60. The side flange 70 corresponds to the side flange 65 and defines a similar included angle, usually a right angle as shown, with the inside surface 64 on the central section 60. The side flange 70, like side flange 65, projects interiorly of the central section 60 and extends along the length of the central section 60 with a projecting height $h_{SF}$, shown at about three inches, along its length that is substantially equal to the height of the side flange 65. An attachment flange 71 is integral with the projecting edge of the side flange 70 and extends outwardly therefrom back under the central section 60 rather than away from the central section 60 as does the attachment flange 66. The attachment flange 71 defines a prescribed included angle shown at 90° with the side flange 70 and has a prescribed transverse width along its length substantially equal to the inside width of the nesting recess in the spacer section 61 behind the attachment flange 65 as will become more apparent. A locating lip 72 is integral with the projecting edge of the attachment flange 71 and extends along the length thereof. The locating lip 72 defines an included angle with the attachment flange 71 such that the lip 71 cooperates with lip 68 on flange section 61 to cause the flange section 62 to nest in flange section 61 as seen in FIG. 10. The locating lip 72 projects toward the exterior of the building and has a convenient height illustrated at about $\frac{1}{2}$ inch. The back side of the attachment flange 71 is spaced sufficiently inboard of the central section 60 and the lip 72 is sufficiently short to allow limited access to the back side of attachment flange 71 by the workman to attach the cover panels CP to the support members SM as will become more apparent.

As best seen in FIGS. 1 and 11, support member SM has a central web 75 along the length thereof with a prescribed transverse width illustrated at about six inches. A mounting flange 76 is integral with each of the opposed side edges of the central web 75 and projects outwardly from the central web 75 normal thereto. It will be seen that one of the mounting flanges 76 projects outwardly from the central web 75 in one direction while the other mounting flange 76 projects outwardly from the central web 75 in the opposite direction. Each of the mounting flanges 76 has a prescribed height illustrated at about two inches and has a reinforcing lip 78 integral with its projecting edge that projects back over the central web 75. The flange sections 61 and 62 are attached to one of the mounting flanges 76 on the support member SM.

The support members SM are attached to the wall beams and roof beams (not shown) in the building framework so that one of the mounting flanges 76 faces exteriorly of the building and is oriented parallel to the plane of the exterior surface of the building. The cover panels CP are oriented so that they are generally normal to the support members SM and adjacent panels CP are positioned so that the flange section 62 on each nests within the flange section 61 on the adjacent cover panel. This causes the attachment flanges 66 and 71 of the nesting flange sections 61 and 62 to lie in juxtaposition with each other as seen in FIG. 10. The cover panels CP are positioned so that the underlying attachment flange 66 lies against the mounting flange 76 on the support member SM as seen in FIGS. 10 and 11. The positioning tool 10 is then used to clamp the juxtaposed attachment flanges 66 and 71 on the cover panels CP and the mounting flange 76 on the support member SM together so that the fastener F can be installed.

The fastener F is best seen in FIG. 11 and is a conventional fastener of the self-drilling and self-tapping type. That is, the fastener F serves to drill its own holes through the work pieces in which it is installed and has threads which self-tap their way into the holes drilled by the fastener as the fastener is installed. The fastener F has a cylindrical shank 80 with an enlarged head 81 on one end thereof and a drill point 82 formed in the opposite end thereof. The head 81 is typically provided with wrenching surfaces 84 to be engaged by a socket on a driving tool as will become more apparent so that fastener F can be rotated by the socket during installation. Also, the head 81 is typically provided with an abutment flange 85 at the base of the head that is engaged by the end of the socket on the driving tool to axially force the fastener against the work pieces to cause the drill point 82 to drill the pilot holes through the work pieces.

The shank 80 has an external self-tapping thread 86 thereon extending from the underside of the head 81 along the shank 80 toward the drill point 82 for a distance $d_T$. This distance $d_T$ is sufficient for the thread 86 to extend through the mounting flange 76 on the support member SM, the juxtaposed flanges 66 and 71 on the cover panels CP, and the locking member LM as will become more apparent. Distance $d_T$ is illustrated at about 0.5 inch. The thread 86 also has a crest diameter $d_C$ sufficiently larger than the shank diameter $d_S$ to cause thread 86 to engage the support member SM, cover panels CP and locking member LM sufficiently to attach them together as will become more apparent. The fastener F may be of any convenient size and is illustrated at a size commonly known as a No. 12-14 with a shank diameter $d_S$ of about 0.160 inch and a crest diameter $d_C$ of about 0.216 inch.

The shank 80 has a length greater than the threaded distance $d_T$ so that an unthreaded portion of the shank 80 extends between the thread 86 and drill point 82 with a length $L_U$. Because the axial rate at which the drill point 82 drills the holes is usually different than the axial rate at which the thread 86 taps into the work pieces, the length $L_U$ is selected so that the drilling operation is completed before the thread 86 starts tapping into the work pieces as will become more apparent. The length $L_U$ illustrated is about 0.4 inch.

While the locking member LM may have a variety of shapes, it is illustrated in FIGS. 12 and 13 as an elongate plate member with opposed parallel side surfaces 88, a length $L_{LM}$, width $W_{LM}$ and thickness $T_{LM}$. Locking member LM has a transverse central axis $A_H$ and a longitudinal axis $A_{LM}$. As will become more apparent, the locking member LM is positioned with one of the side surfaces 88 against the back side of the attachment flange 66 on the flange section 61 and with the longitudinal axis $A_{LM}$ of locking member LM extending longitudinally of the attachment flange 66. Because the locking member LM fits between the side flange 65 and reinforcing lip 68 on the flange section 61, the width $W_{LM}$ is less than the transverse width of the attachment flange 66. The length $L_{LM}$ can be of any convenient size and is typically longer than the transverse width of the attachment flange 66. The thickness $T_{LM}$ of locking member LM is selected to provide sufficient engagement between the thread 86 on fastener F and the locking member LM to keep the cover panels CP attached to the support member SM as will become more apparent. The locking member LM is provided with a hole 89 transversely therethrough concentrically of axis $A_H$ with a diameter $d_H$. The hole diameter $d_H$ is larger than the diameter $d_S$ of the shank 80 of fastener F but smaller than the crest diameter $d_C$ of the thread 86 on fastener F so that the shank 80 will pass freely therethrough while the thread 86 will tap into the locking member LM sufficiently to keep the cover panels CP attached to the support member SM. The locking member LM illustrated in FIGS. 12 and 13 has a length $L_{LM}$ of about 1.2 inches, a width $W_{LM}$ of about 0.4 inch, a thickness $T_{LM}$ of about 0.16 inch and a hole diameter $d_H$ of about 0.2 inch.

Because the fastener F is self-drilling, it will be appreciated that the hole 89 may be omitted and the fastener F used to drill a hole through the locking member LM. If the hole through the locking member LM is omitted, the unthreaded portion of the fastener shank 80 is selected to have a length such that the drill point 82 can drill a hole through the mounting flange 76 on the support member SM, the juxtaposed attachment flanges 66 and 71 on the cover panels CP, and the locking member LM before the self-tapping thread 86 on fastener F engages the mounting flange 76 on the support member SM. To maximize the speed at which the fastener F can be installed, the locking member LM without the hole should be as thin as possible while still maintaining sufficient engagement between the fastener thread 86 and the locking member LM to keep the cover panels CP in place. By selecting a locking member LM out of about the same material as the support member (i.e. steel) with a thickness about the same as that of the mounting flange 76 on the support member SM, an acceptable installation speed can be maintained while sufficient joint strength is maintained to keep the cover panels CP in place.

INSTALLATION

Figure 14:
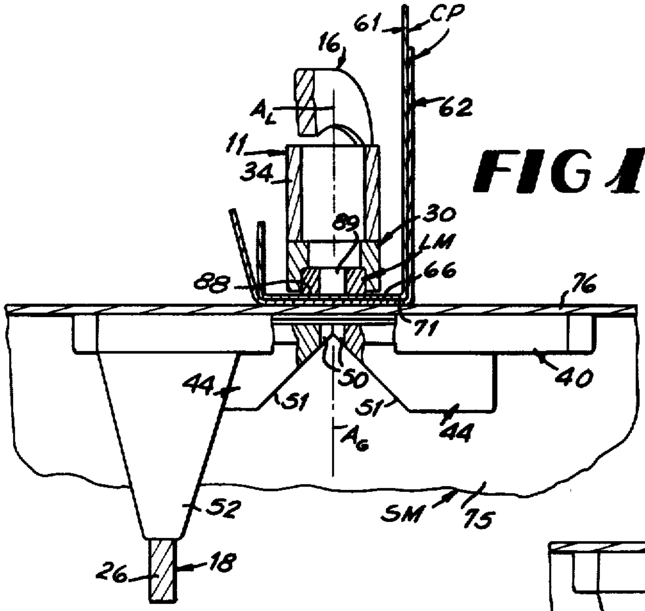
FIGS. 14–17 are views taken similarly to FIG. 9 showing the invention being used in the erection of a building.

The attachment of the cover panel CP to the support members SM according to the invention is best seen in FIGS. 14–17. The cover panels CP are arranged so that they are oriented generally perpendicular to the support members SM with the flange section 62 on each of the cover panels CP nesting in the flange section 61 of the adjacent cover panel CP. The nesting flange sections 61 and 62 are placed against the mounting flange 76 on the support member SM so that the attachment flange 66 on the flange section 61 rests against the mounting flange 76 with the attachment flange 71 on the flange section 62 juxtaposed against the flange 76 as best seen in FIG. 14. The nesting flange sections 61 and 62 are sized so that the flange section 62 keeps the flange section 61 in place.

With the clamping assembly 14 of the positioning tool 10 in its unlocked and opened position as illustrated by dashed lines in FIG. 3, the workman places a locking member LM in the locating recess 32 in the locating assembly 11. Because the locating recess 32 is sized to just receive the locking member LM therein, the locking member LM is fixedly held with respect to the locating assembly 11. It will also be noted that the depth of the locating recess 32 is no more than the thickness of the locking member LM so that the side surface 88 on the locking member LM facing out of the locating recess 32 in the locating assembly 11 is at least flush with the working face 31 on the locating assembly 11 or projects slightly thereabove. Because the locking member LM is ferro-magnetic, the magnets 38 in the locating assembly 11 hold the locking member LM in place in the locating recess 32.

While the locking member LM is carried in the locating recess 32 in the locating assembly 11, the clamping assembly is maintained in its open position so that the spacing between the locating assembly 11 and guide assembly 12 is sufficient for the locating assembly 11 to pass behind the reinforcing lips 68 and 72 on the flange sections 61 and 62 while the guide assembly 12 can pass over the reinforcing lip 78 on the mounting flange 76 of support member SM. The workman places the locating assembly 11 in the recess formed behind the attachment flange 66 between the side flange 65 and the reinforcing lip 68 on the cover panels CP while the guide assembly 12 is located in front of the mounting flange 76 between the central web 75 and reinforcing lip 78 on the support member SM. The workman then closes the handles 15 and 19 of the clamping assembly 14 to their locked position to force the locating assembly 11 and guide assembly 12 toward each other. The workman has preadjusted the positioning screw 22 on the clamping assembly 14 so that, when the clamping assembly 14 is in its locked position, the flange sections 61 and 62 on the cover panel CP and the mounting flange 76 on the support member SM are clamped together by the assemblies 11 and 12 on tool 10 as seen in FIG. 14. With the tool 10 in its clamped position, the size of the recess 32 in the locating assembly 11 and the thickness of the locking member LM causes the locking member LM to bear against the attachment flange 71 with the force that the locking member LM is to exert on the cover panels CP after the fastener F is installed. The width $W_1$ of the working face 31 on the locating assembly 11 is slightly less than that of the attachment flange 71 as seen in FIG. 14 while the width $W_2$ of the working face 41 on the guide assembly 12 is about the same as that of the mounting flange 76 on the support member SM as seen in FIG. 4. Because the longitudinal axis $A_1$ of the locating assembly 11 is located perpendicular to the longitudinal axis $A_3$ of the guide assembly 12, the locating assembly 11 and guide assembly 12 are inherently positioned so that they are properly located for the installation of the fastener F into the locking member LM. At this position, it will be seen in FIG. 14 that the axes $A_L$ and $A_G$ of the assemblies 11 and 12 are coaxial. It will further be noted that, when the assemblies 11 and 12 are clamped as in FIG. 14, the cutouts 50 through the retractable guide members 44 are located so that the opening defined therebetween is coaxial with the hole 89 through the locking member LM. The angular position between the clamping assembly 14 and the locating and guide assemblies 11 and 12 is such that the clamping assembly 14 projects outwardly from the cover panels CP and support member SM so as not to interfere with the operation of the locating assembly 11 and guide assembly 12 as best seen in FIG. 2.

Figure 15:
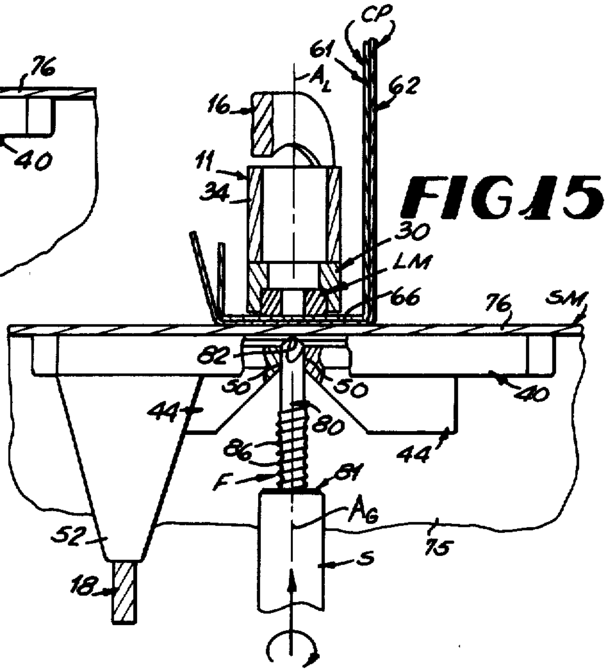

With the positioning tool 10 holding the cover panels CP onto the support member SM, the workman places the fastener F in the socket S of the driving tool (not shown) as seen in FIG. 15. The head 81 of the fastener F is held in the socket S by conventional means such as magnets so that the fastener axis is generally coaxial with the socket axis and the shank 80 of the fastener projects forwardly of the socket S. The workman positions the driving tool so that the socket and fastener axes are coaxially aligned with the guide assembly axis $A_G$ and then inserts the drill point of the fastener F through the semicircular cutouts 50 in the retractable guide members 44 so that the drill point 82 rests against the mounting flange 76 on the support member SM as seen in FIG. 15. This locates the drill point 82 so that the axis of the fastener F is coaxial with the hole 89 through the locking member LM.

Figure 16:
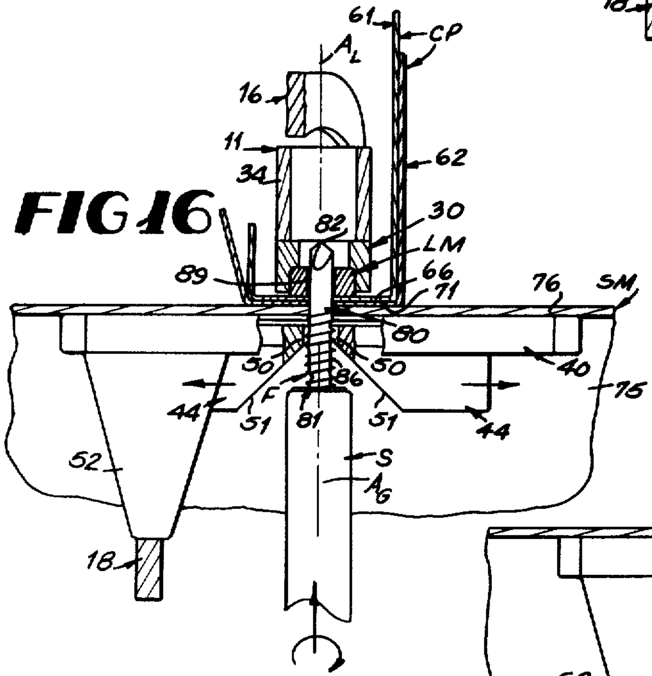

With the fastener F thus located, the workman activates the driving tool to rotate the socket S and thus fastener F. At the same time, the workman urges the driving tool toward the mounting flange 76 with sufficient force to cause the drill point 82 to start drilling a hole through the mounting flange 76 on support member SM. As rotation of the fastener F continues, holes are successively drilled through the mounting flange 76 on support member SM, the attachment flange 71 on cover panel CP and the attachment flange 66 on the other cover panel CP. As soon as the drill point 82 on fastener F completes the drilling of the holes, the unthreaded portion of the fastener shank 80 supports the fastener in the holes while fastener slips forwardly until the leading end of the self-tapping thread 86 engages the mounting flange 76 as seen in FIG. 16. As the leading end of the shank 80 exits the back side of the attachment flange 71 on cover panel CP, it slidably extends into the hole 89 through the locking member LM.

Figure 17:
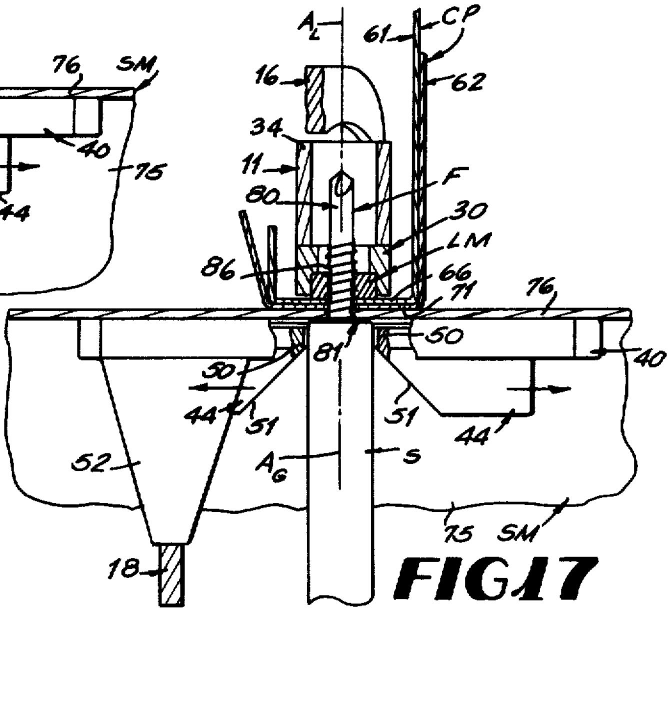

As the driving tool continues to rotate the fastener F, the thread 86 self-taps its way successively through the mounting flange 76 on support member SM, the attachment flange 71 on cover panel CP, the attachment flange 66 on the cover panel CP, and the locking member LM. Rotation of fastener F is continued until the head 81 seats on the mounting flange 76 of support member SM as seen in FIG. 17.

As the fastener F is installed, its head 81 and the projecting end of the socket S are moved toward the mounting flange 76 on the support member SM. During this movement, the abutment flange 85 on the fastener head 81 or the projecting end of the socket S engages the camming surfaces 51 on the guide members 44. As this movement continues, the guide members 44 are forced apart against the action of springs 45 so that the fastener head 81 can pass between members 44 in order for the underside of head 81 to seat against the mounting flange 76 on the support member SM as seen in FIG. 17. The camming surfaces 51 are not engaged until the drill point 82 on fastener F has drilled into the mounting flange 76 on support member SM sufficiently to maintain the alignment of fastener F after the guide members 44 are retracted. Thus, while the camming members 44 serve to initially locate the fastener F properly for location, they are retractable to permit the fastener F to be fully installed after the initial locating function has been served.

When the head 81 on fastener F seats against the mounting flange 76 on the support member SM, the installation is complete. Because the locking member LM is preclamped against the attachment flange 71, the installation of the fastener F causes the locking member LM to remain in this clamped position to maintain a seal between the flanges 66 and 71 on cover panels CP even though the fastener F is not rotated after the underside of the head 81 seats against the mounting flange 76 on the support member SM. After the head 81 of the fastener F is seated, the workman removes the socket from the head of the fastener F and then unlocks a clamping assembly 14 to release the locating assembly 11 and guide assembly 12 and removes the positioning tool 10 leaving the fastener F and locking member LM in place as seen in FIGS. 9 and 10.

Where a locking member LM without a hole 89 is used, it will be seen that the same procedure as described above is used. After the drill point 82 on fastener F has drilled through the mounting flange 76 on the support member SM and the attachment flanges 66 and 71 on the cover panels CP, it is also used to drill a hole through the locking member LM. After the drilling operation, the thread 86 self-taps its way through the parts as described above to complete the installation. The finished joint would be the same as that described above using a locking member LM with the preformed hole.

What is claimed as invention is:

1. A system for use in attaching a plurality of juxtaposed work pieces together comprising:

means for rotating a fastener including a shank and a head integral with the trailing end of said shank, said shank defining a self-drilling point on the leading end thereof opposite said head and said fastener further including a self-tapping thread, into one side of said workpieces and a locking member on the other side of the workpieces adapted to be threadedly engaged by said fastener and defining a work piece engaging surface thereon; and an installation tool including a locating assembly; a guide assembly; and a positioning means for selectively positioning said locating assembly and said guide assembly with respect to each other so that said locating assembly can be positioned on one side of the work pieces and said guide assembly can be positioned on the opposite side of the work pieces, said locating assembly adapted to removably mount said locking member thereon with said work piece engaging surface facing the work pieces so that when said locating and guide assemblies are moved toward each other, the work pieces will be clamped between said locking member and said guide assembly, said guide assembly rotatably locating the self-drilling point on said fastener so that, as said fastener is rotated, said fastener will self-drill and self-tap through the juxtaposed work pieces and threadedly engage said locking member to hold the work pieces between the head of said fastener and said locking member.

2. The system of claim 1 wherein said positioning means of said installation tool further includes releasable locking means for selectively locking said positioning means in a position maintaining said work pieces and said locking member clamped together.

3. The system of claim 2 wherein said guide assembly on said installation tool further includes a mount adapted to engage the work pieces in opposition to said locating assembly; at least one guide member movably mounted between an extended position and a retracted position; and forcing means for urging said guide member from said retracted position toward said extended position, said guide member including fastener guide means adapted to engage and locate the self-drilling point on said fastener when said guide means is in said extended position so that the leading end of said fastener is operatively aligned with said locking member through the work pieces, and said guide member adapted to be retracted from said extended position toward said retracted position against said forcing means after said fastener has drilled into the work pieces sufficiently to maintain the leading end of said fastener aligned with the locking member so that the head of said fastener can move past said guide member without interference therewith and seat against the side of the work pieces in opposition to said locking member.

4. The system of claim 3 wherein said guide member defines a cam surface thereon adapted to be engaged by the head on said fastener to move said guide member toward said retracted position so that the head on said fastener can pass thereby as said fastener is installed.

5. The system of claim 4 wherein said locating assembly includes a base adapted to engage the one side of the work pieces, said base defining a recess therein adapted to receive and support said locking member therein so that said locking member is clamped against the one side of the work pieces, said locating assembly further including means for releasably retaining said locking member in said recess until said locking member is threadedly engaged by said fastener.

6. The system of claim 5 wherein said locking member defines a hole therethrough adapted to receive the shank of said fastener in clearance therethrough while the thread on said fastener self-taps into said locking member about the hole to threadedly engage said locking member and wherein said positioning means maintains a prescribed orientation between said locating assembly and said guide assembly so that said guide assembly positions the leading end of said fastener on the opposite side of the work pieces in axial alignment with the hole through said locking member whereby the shank of said fastener passes into the hole through said locking member and the thread on said fastener self-taps into said locking member about the hole as said fastener is rotated.

* * * * *